US012528517B2

(12) United States Patent
Monninger et al.

(10) Patent No.: US 12,528,517 B2
(45) Date of Patent: Jan. 20, 2026

(54) SYSTEM AND METHOD FOR EVALUATING MOTION PREDICTION MODELS

(71) Applicant: Mercedes-Benz Group AG, Stuttgart (DE)

(72) Inventors: Thomas Monninger, Sunnyvale, CA (US); Julian Schmidt, Stuttgart (DE); Julian Jordan, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 293 days.

(21) Appl. No.: 18/125,628

(22) Filed: Mar. 23, 2023

(65) Prior Publication Data
US 2024/0317273 A1 Sep. 26, 2024

(51) Int. Cl.
*B60W 60/00* (2020.01)
*B60W 10/18* (2012.01)
(Continued)

(52) U.S. Cl.
CPC ...... *B60W 60/00276* (2020.02); *B60W 10/18* (2013.01); *B60W 10/20* (2013.01); *B60W 50/0097* (2013.01); *B60W 2552/53* (2020.02)

(58) Field of Classification Search
CPC .......... B60W 60/00276; B60W 10/18; B60W 10/20; B60W 50/0097; B60W 2552/53
(Continued)

(56) References Cited

U.S. PATENT DOCUMENTS

| 11,216,000 B2 | 1/2022 | Johnson | |
|---|---|---|---|
| 2010/0010699 A1* | 1/2010 | Taguchi | B60W 30/08 701/23 |

(Continued)

FOREIGN PATENT DOCUMENTS

| CN | 110400490 | 2/2022 |
|---|---|---|
| CN | 112839855 | 7/2022 |
| CN | 114067562 | 8/2022 |

OTHER PUBLICATIONS

Scott Ettinger et al., "Large Scale Interactive Motion Forecasting for Autonomous Driving: The Waymo Open Motion Dataset", 2021 IEEE/CVF International Conference on Computer Vision (ICCV), IEEE, Oct. 10, 2021 (Oct. 10, 2021), pp. 9690-9699, XP034092851, DOI: 10.1109/ICCV48922.2021.00957 [retrieved on Feb. 10, 2022].
(Continued)

*Primary Examiner* — Hunter B Lonsberry
*Assistant Examiner* — Helen Li
(74) *Attorney, Agent, or Firm* — Mahamedi IP Law LLP (57) ABSTRACT

A computing system can receive motion prediction data from a vehicle, where the motion prediction data is generated by a motion prediction model executing on the vehicle. Based on the motion prediction data, the system can determine predicted trajectories for a plurality of entities in a surrounding environment of the vehicle. The system can evaluate a prediction performance of the motion prediction model by (i) matching, for each respective entity of the plurality of entities, a predicted endpoint of each predicted trajectory of the set of predicted trajectories to one or more underlying lanes of the road segment, (ii) matching a ground truth future position of the entity to one or more underlying lanes of the underlying lane topology, and (iii) determining a distance along one or more lane segments between the lane(s) matched to the predicted endpoint and the lane(s) matched to the ground truth future position.

12 Claims, 6 Drawing Sheets

(51) Int. Cl.
 *B60W 10/20* (2006.01)
 *B60W 50/00* (2006.01)
(58) Field of Classification Search
 USPC .......................................................... 701/25
 See application file for complete search history.

(56) References Cited

U.S. PATENT DOCUMENTS

| | | | |
|---|---|---|---|
| 2012/0101711 A1* | 4/2012 | Furmston | G01S 13/931 |
| | | | 701/300 |
| 2019/0016339 A1* | 1/2019 | Ishioka | B60W 30/0956 |
| 2019/0077398 A1* | 3/2019 | Kusano | B60W 30/0956 |
| 2019/0235520 A1* | 8/2019 | Parchami | B60W 30/09 |
| 2019/0384304 A1* | 12/2019 | Towal | G05D 1/0221 |
| 2020/0172093 A1* | 6/2020 | Kum | G06N 3/047 |
| 2020/0258380 A1* | 8/2020 | Wissing | G08G 1/04 |
| 2021/0070286 A1* | 3/2021 | Green | G06V 10/25 |
| 2021/0272018 A1* | 9/2021 | Casas | G05B 13/0265 |
| 2021/0295171 A1* | 9/2021 | Kamenev | G06N 3/088 |
| 2022/0227397 A1* | 7/2022 | Jiang | G06F 11/3013 |
| 2024/0208536 A1* | 6/2024 | Pronovost | B60W 30/18159 |

OTHER PUBLICATIONS

Baotian He et. al., "Multi-future Transformer: Learning diverse interaction modes for behaviour prediction in autonomous driving", IET Intelligent Transport Systems, The Institution of Engineering and Technology, vol. 16, No. 9, Jun. 3, 2022 (Jun. 3, 2022), pp. 1249-1267, XP006116573, DOI: 10.1049/ITR2.12207.

International Search Report with Written Opinion of the International Searching Authority for the Application No. PCT/EP2024/025116 mailed Jul. 9, 2024.

Boris Ivanovic, Rethinking Trajectory Forecasting Evaluation, NVIDIA Research, Jul. 21, 2021. pp. 1-7. Found at: https://arxiv.org/pdf/2107.10297.pdf.

Jianwu Fang, Behavioral Intention Prediction in Driving Scenes: A Survey, IEEE Latex, Dec. 8, 2023. pp. 1-21. Found at: https://arxiv.org/pdf/2211.00385.pdf.

* cited by examiner

SYSTEM AND METHOD FOR EVALUATING MOTION PREDICTION MODELS

BACKGROUND

Autonomous vehicles implement motion prediction for external agents or entities (e.g., other vehicles, pedestrians, bicyclists, and other moving objects) to safely navigate through a road network. Motion prediction models are executed on board the autonomous vehicles to plan sequences of trajectories such that, ideally, no collisions occur and the autonomous vehicle operates in a safe, consistent, and reliable manner.

SUMMARY

A computing system is described herein for evaluating motion prediction models for implementation by semi-autonomous or fully autonomous vehicles. In various examples, the computing system can receive motion prediction data from a vehicle. The motion prediction data may be generated by a motion prediction model executing on the vehicle as the vehicle operates along a travel path within a road network. Based on the motion prediction data, the computing system can determine a set of predicted trajectories for each of a plurality of entities in a surrounding environment of the vehicle. The system may then determine an underlying lane topology of a road segment on which the vehicle operates, and evaluate a prediction performance of the motion prediction model based on whether the ground truth future positions of the entities lie within an error tolerance area that is based on matching the trajectories to the underlying lanes.

As provided herein, a road segment can comprise multiple lanes, which can include turning lanes, opposing traffic lanes, parking spaces, and/or lane having the same directional traffic as the vehicle. For example, the road segment can include the current position of the vehicle and any surrounding vehicles, each of which travel in a particular lane or can switch between lanes. The road segment can further include a predicted trajectory of each of the surrounding vehicles and/or other entities, as well as a future ground truth position of the vehicle and the surrounding vehicles and/or entities. A lane segment comprises a portion of a single lane of the road segment. According to examples described herein, the vehicle and surrounding entities operate along a road segment, and can occupy a single lane segment at any given time, or may occupy multiple lane segments (e.g., when changing lanes).

According to various examples described herein, the system can evaluate the motion prediction model by matching, for each respective entity of the plurality of entities, predicted endpoints of the set of predicted trajectories to the underlying lanes of the underlying lane topology of the road segment. The system may then determine one or more matched lane segments for each predicted trajectory. In some examples, the system can do so based on determining an assignment confidence for each lane segment of the underlying lane topology within a proximity to the predicted trajectory, and then determining a distance between the predicted endpoint and a ground-truth future position of the respective entity along the matched lane segment (e.g., as recorded by a set of sensors on board the vehicle).

In certain implementations, the computing system can determine the matched lane segment(s) for a predicted trajectory based on the matched lane segment(s) having highest assignment confidences in relation to the other proximate lanes of the underlying lane topology. In further examples, the computing system can match the predicted endpoint of the predicted trajectory by dynamically calculating a distance-based assignment confidence and an orientation-based assignment confidence for each surrounding lane segment of the predicted trajectory. In such examples, the computing system may determine the highest assignment confidence of the underlying lane segment based on dynamically calculating the distance-based assignment confidence and the orientation-based assignment confidence.

In various examples, the same matching procedure is also performed with the ground-truth endpoint of the entity. In particular, the ground-truth endpoint of the vehicle is matched to one or more underlying lanes (e.g., based on calculating distance-based and orientation-based assignment confidences to assign the ground-truth endpoint to a particular lane segment).

In various examples, the computing system can receive recorded sensor data from the vehicle, which can indicate a ground truth trajectory for each of the plurality of entities. Based on the ground truth trajectory for each of the plurality of entities, the computing system can determine the ground truth future position of each of the plurality of entities at a future time corresponding to the prediction of the trajectory and endpoint of the entity. If the ground truth position lies within an error tolerance area that is based on the matched underlying lanes, then the prediction can comprise a "hit." If the ground truth position lies outside of the error tolerance area, then the prediction can comprise a "miss."

Additionally or alternatively, the computing system can evaluate the motion prediction model by dynamically determining a distance along the lane segment that connects the lane segment matched to the predicted endpoint and the lane segment matched to the ground-truth endpoint. These matched lane segments can comprise the same lane segment or different lane segments, where the distance therebetween provides an indication of the accuracy of the motion prediction model. As such, the computing system compares the lane segment matches between the predicted endpoint of the entity and the ground truth endpoint of the entity to evaluate the motion prediction model.

As provided herein, the vehicle can comprise an autonomous vehicle that executes the motion prediction model to dynamically generate a motion plan based, at least in part, on the set of predicted trajectories for each of the plurality of entities in the surrounding environment of the autonomous vehicle, and autonomously operate a set of control mechanisms of the autonomous vehicle to execute the motion plan. These control mechanisms can include a braking system, a steering system, an acceleration system, and/or a signaling system that the on-board computing system of the vehicle autonomously operates in accordance with the motion plan.

The computing system can evaluate the prediction performance of each of a plurality of motion prediction models in the manner described herein to determine a most accurate motion prediction model for execution on autonomous vehicles. As provided herein, the determination of distance-based assignment confidence and orientation-based assignment confidence for matching the predicted endpoints of the predicted trajectories to underlying lanes enables greater tolerance of longitudinal errors in comparison to lateral errors, which are more critical to autonomous vehicle safety. Previous approaches (e.g., Euclidean-based evaluation methods) treat longitudinal and lateral errors similarly, which can result in a motion prediction model having low overall error qualities, but still an unacceptable level of lateral error in terms of safety.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Evaluation metrics are required to make decisions regarding motion prediction models that will be implemented by autonomous vehicles. Autonomous vehicle operators will typically develop and test multiple approaches to motion planning, and require quantitative methods to determine which motion planning model(s) to deploy in a fleet of semi-autonomous or fully autonomous vehicles. Evaluation metrics are also required to monitor how well a machine learning-based, motion prediction model can scale with data. According to embodiments described herein, a computing system is provided to quantify whether specific scenarios (e.g., unprotected left turns) are predicted in a sufficient manner—from an accuracy and safety perspective—and whether additional, new fleet data improves the prediction performance of the motion prediction model (e.g., as measured by the metric). In performing motion prediction model evaluation techniques described herein, it is contemplated that the computing system can determine an optimal motion prediction model to distribute to a fleet of semi-autonomous and/or autonomous vehicles.

Previous methods of motion prediction of external entities of the vehicle (e.g., other vehicles, pedestrians, bicyclists, and other moving objects) have involved Euclidean-based metrics (e.g., distance in Euclidean space), or intent prediction models in which machine-learning is implemented to predict the immediate intent of, for example, a nearby vehicle. For Euclidean distance methods, lateral error may be treated equally or similarly to longitudinal error, even though lateral error may yield a trajectory prediction that positions the entity on the oncoming, opposing lane. In typical road scenarios, a prediction delta in the longitudinal direction (e.g., in the direction of travel of the vehicle) is considerably less severe than the same delta in the lateral direction.

For intention prediction approaches, intention labels (e.g., entity will brake, turn left, change lanes, etc.) are determined for each external entity, and prediction accuracy is calculated based on these semantic labels. Inaccurate intention predictions may result in dangerous scenarios, such as collision events or hazards to vulnerable road users (VRUs) (e.g., pedestrians and bicyclists). Furthermore, evaluation of intention prediction models involves determining whether the semantic labels match the ground truth intent of the entities to generate a set of accuracy scores.

According to examples described herein, a computing system is provided that evaluates the accuracy of motion prediction models using the underlying lane topology of the road segment on which the vehicle operates as a constraint. In particular, the computing system can receive motion prediction data from a fleet of autonomous vehicles that implement motion prediction models to navigate along a road network. In various examples, each motion prediction model can comprise a machine-learning model that predicts the trajectory of external entities, such as detected vehicles operating on the same road segment as the vehicle, and VRUs, such as pedestrians and bicyclists. These motion prediction models may utilize various different approaches in predicting the trajectories of external entities, such as interaction-aware models (e.g., in which reactions of external entities to the motion plan of the vehicle is accounted for), coupled motion planner and prediction models, object classification and prediction models, physics based motion models, maneuver-based motion models, and the like.

In embodiments described herein, the backend computing system can process the motion prediction data based on the implementation of a particular motion prediction model from a set of vehicles and determine a set of predicted trajectories of external entities to those vehicles. These predicted trajectories can comprise predictions made by the vehicles in generating and executing a dynamic motion plan to traverse the underlying road segment. The computing system can further receive ground truth information from the vehicles, which can comprise sensor data indicating the actual trajectories taken by the external entities and the vehicle itself. The computing system can match endpoints of all predicted trajectories to the underlying lanes of the road segment (e.g., the centerlines of the lanes). Based on the distance to a surrounding lane segment and the difference in orientation to the surrounding lane segment, the computing system can calculate an assignment confidence to select one or more matched lane segments for the predicted trajectory.

In various examples, the computing system can utilize the endpoints of the predicted trajectory on the matched lane segment to determine a distance to the ground truth future position of the entity to determine an accuracy of the prediction. In certain aspects, the computing system can match the ground truth future position of the external entity to one or more underlying lane segments of the road segment. For example, the computing system can calculate an assignment confidence in the same or similar manner as with the predicted endpoints to select one or more matched lane segments for the ground-truth endpoint of the external entity. The computing system can then determine a distance along a lane segment that connects the lane segment match of the predicted endpoint and the lane segment match of the ground-truth endpoint.

In some examples, the computing system can generate or establish an error tolerance area based on the matched lanes and evaluate whether the ground truth future position ends up within the error tolerance area. As such, the computing system performs this lane matching and evaluation technique dynamically for all trajectory and endpoint predictions made by the motion prediction model for any number of external entities as the vehicle operates throughout the road network. As provided herein, using the distance threshold or error tolerance area as an evaluation metric, the computing system may then evaluate an overall accuracy of the motion prediction model. In various examples, the computing system can perform this lane topology-based evaluation technique for multiple motion prediction models, and determine a most accurate and/or robust motion prediction model for execution on a fleet of autonomous or semi-autonomous vehicles. It is contemplated that the evaluation methods described herein can be repeated for new or updated motion prediction models to provide updated information regarding the most accurate motion prediction model(s).

In certain implementations, the computing system can perform one or more functions described herein using a learning-based approach, such as by executing an artificial neural network (e.g., a recurrent neural network, convolutional neural network, etc.) or one or more machine-learning models to process the respective set of trajectories and classify the driving behavior of each human-driven vehicle through the intersection. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

As further provided herein, an "autonomy map" or "autonomous driving map" can comprise a ground truth map recorded by a mapping vehicle using various sensors (e.g., LIDAR sensors and/or a suite of cameras or other imaging devices) and labeled (manually or automatically) to indicate traffic objects and/or right-of-way rules at any given location. In variations, an autonomy map can involve reconstructed scenes using decoders from encoded sensor data recorded and compressed by vehicles. For example, a given autonomy map can be human-labeled based on observed traffic signage, traffic signals, and lane markings in the ground truth map. In further examples, reference points or other points of interest may be further labeled on the autonomy map for additional assistance to the autonomous vehicle. Autonomous vehicles or self-driving vehicles may then utilize the labeled autonomy maps to perform localization, pose, change detection, and various other operations required for autonomous driving on public roads. For example, an autonomous vehicle can reference an autonomy map for determining the traffic rules (e.g., speed limit) at the vehicle's current location, and can dynamically compare live sensor data from an on-board sensor suite with a corresponding autonomy map to safely navigate along a current route.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer-programs, or a computer usable carrier medium capable of carrying such a program.

Example Computing System

Figure 1:
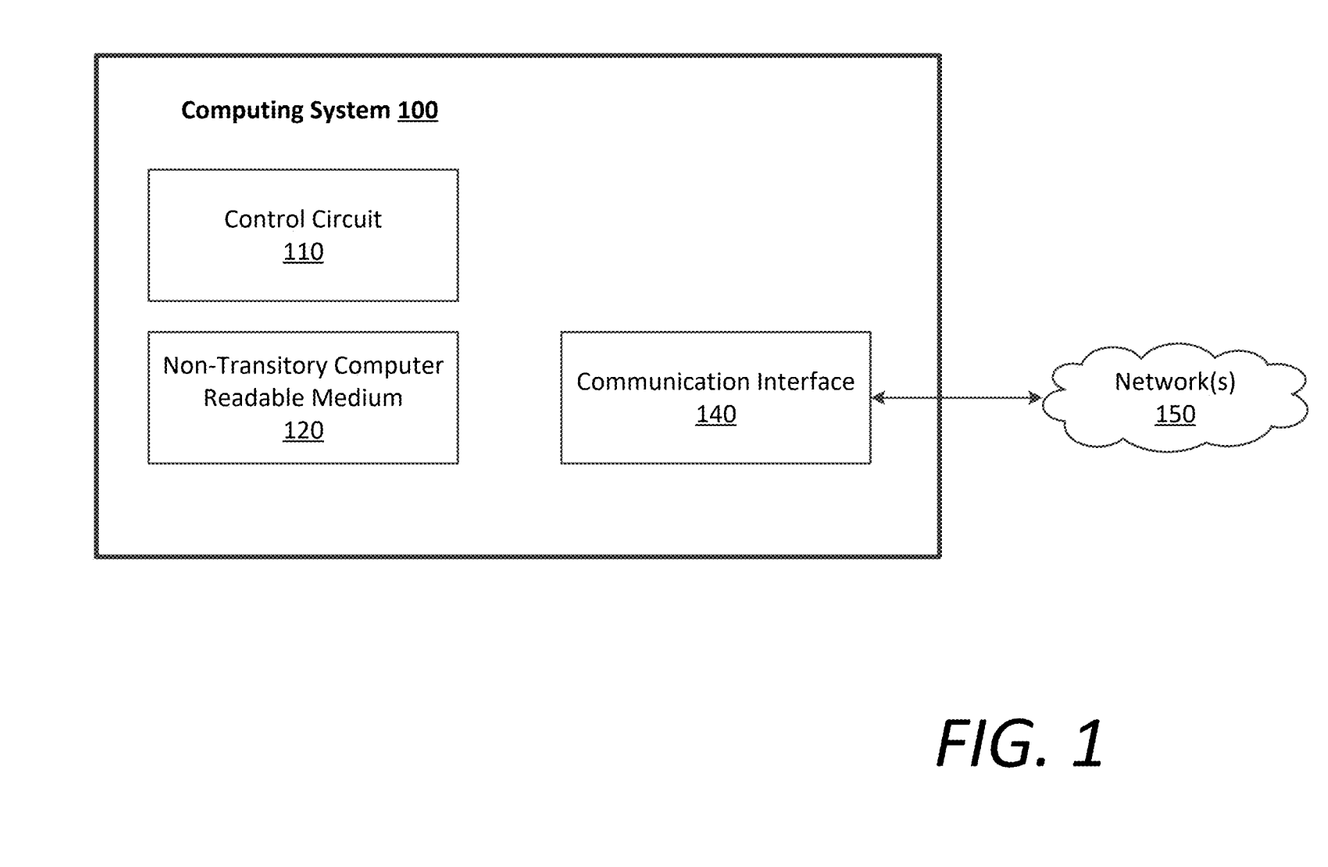
FIG. 1 is a block diagram depicting an example computing system for evaluating motion prediction models in accordance with examples described herein.

FIG. 1 is a block diagram depicting an example computing system for generating a fused environment representation for a vehicle, according to examples described herein. In an embodiment, the computing system 100 can include a control circuit 110 that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 110 and/or computing system 100 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, or any other controller (the term "or" is used herein interchangeably with "and/or"). In variations, the control circuit 110 and/or computing system 100 can be included on one or more servers (e.g., backend servers).

In an embodiment, the control circuit 110 may be programmed by one or more computer-readable or computer-executable instructions stored on the non-transitory computer-readable medium 120. The non-transitory computer-readable medium 120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 120 may form, e.g., a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 120 may store computer-executable instructions or computer-readable instructions, such as instructions to perform the below methods described in connection with of FIGS. 4 and 5.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 110 to perform one or more functional tasks. The modules and computer-readable/executable instructions may be described as performing various operations or tasks when a control circuit 110 or other hardware component is executing the modules or computer-readable instructions.

In further embodiments, the computing system 100 can include a communication interface 140 that enables communications over one or more networks 150 to transmit and receive data. The communication interface 140 may include any circuits, components, software, etc. for communicating via one or more networks 150 (e.g., a local area network, wide area network, the Internet, secure network, cellular network, mesh network, and/or peer-to-peer communication link). In some implementations, the communication interface 140 may include for example, one or more of a communications controller, receiver, transceiver, transmitter, port, conductors, software and/or hardware for communicating data/information.

As an example embodiment, the computing system 100 can comprise a backend computing system that receives motion prediction data from vehicles that execute a motion planning model to operate throughout a road network. As provided herein, the motion prediction data received from a vehicle can indicate predicted paths of surrounding entities as determined by the motion prediction model executing on-board the vehicle. In further implementations, the motion prediction data can comprise sensor data (e.g., image data, LIDAR data, radar data, etc.) that indicates the ground truth path of each entity (e.g., the ground truth future of the external entity in relation to when the prediction is made).

The computing system 100 can determine the underlying lane topology of the road segment on which the vehicle operates (e.g., using map data or the ground truth data from the vehicle), and can match or otherwise assign each predicted trajectory of a particular external entity to a particular lane of the underlying topology. As such, for evaluating the motion planning model, the computing system 100 can generate a far smaller "hit" area for the predicted trajectories in comparison to Euclidean-based methods. It is contemplated that the accuracy of the motion prediction model based on this evaluation method can provide for greater accuracy penalties for lateral error, which can result in more safe and robust motion prediction models for distribution to autonomous vehicles (e.g., models that have less error in the lateral direction).

System Description

Figure 2:
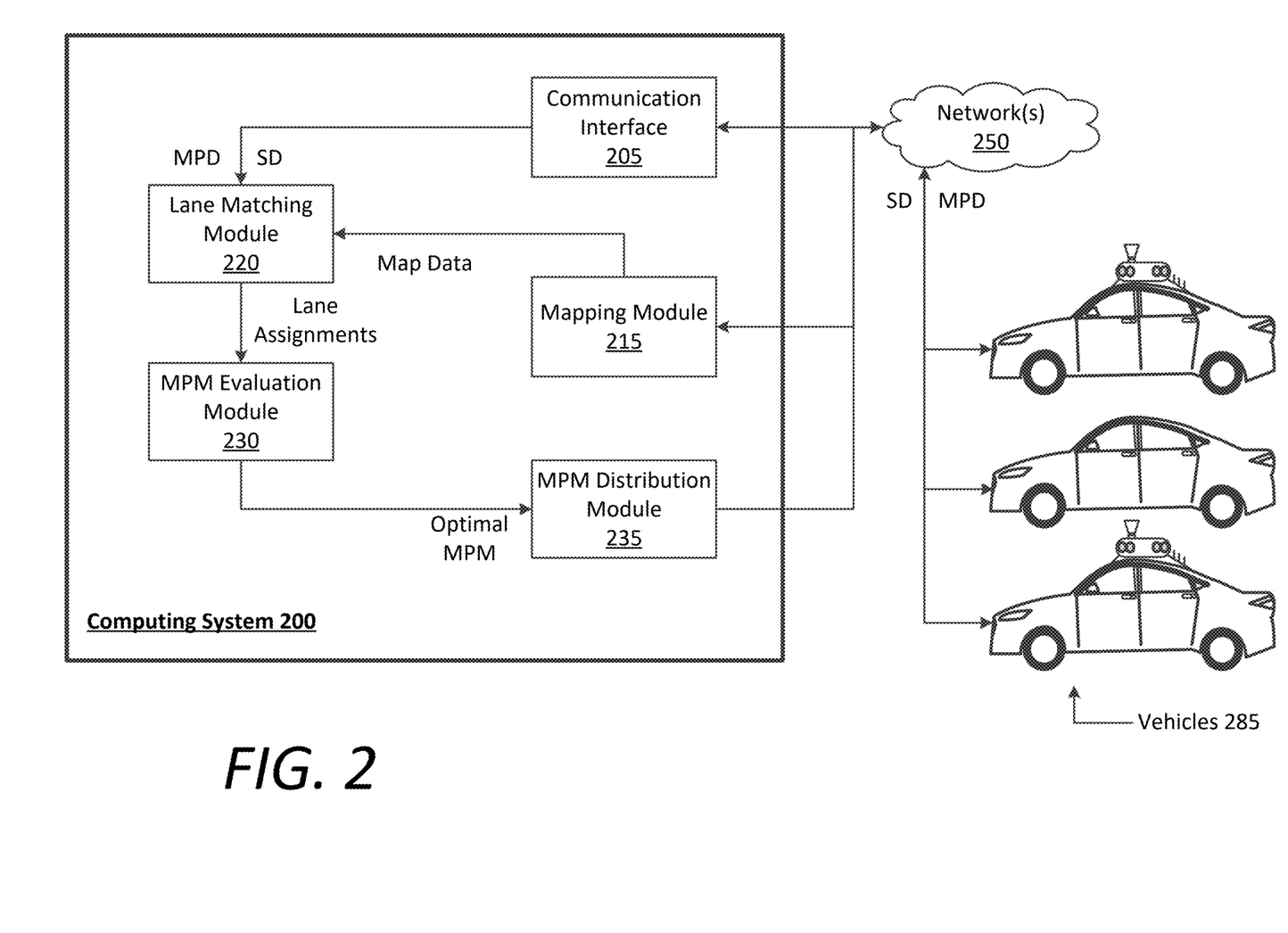
FIG. 2 is a block diagram illustrating a computing system including specialized modules for evaluating motion prediction models, according to examples described herein.

FIG. 2 is a block diagram illustrating a computing system 200 including specialized modules for evaluating motion prediction models, according to examples described herein. In certain examples, the computing system 200 can include a communication interface 205 to communicate, over one or more networks 250, with vehicles 285 operating throughout a road network. As provided herein, the vehicles 285 can comprise autonomous or semi-autonomous vehicles that operate motion prediction models to navigate through the vehicle's surrounding environment along a travel route. The motion prediction model is utilized to identify entities external to the vehicle, classify the external entities, and/or predict a current trajectory and/or future position or area at which the external entity will be located. Based on these predictions, the on-board computing system of the vehicle 285 can dynamically generate a motion plan to navigate through the environment.

Specifically, the vehicles 285 can each include a sensor suite comprising a set of sensors, such as image sensors, LIDAR sensors, radar sensors, ultrasonic sensors, and the like. Based on real-time sensor data, an on-board computing system of the vehicle 285 can identify external entities, such as other vehicles and vulnerable road users (VRUs), and execute a motion prediction model to dynamically predict a location or area at which each external entity will be at a future time (e.g., five seconds into the future). The overall predictions made by the on-board computing systems can be recorded by the vehicles as motion prediction data (MPD). In further examples, the computing system 200 can receive ground truth information included in sensor data (SD) from the vehicles, which can indicate the actual trajectories of the external entities as recorded by the vehicle's sensors.

In various examples, the computing system 200 can receive the motion prediction data from the vehicles 285, which can provide information indicating the manner in which the motion prediction models predict the trajectories of the external entities. The computing system 200 can include a lane matching module 220 that matches the predicted trajectories of each external entity to the underlying lanes of the road segment on which the vehicle 285 operates. For example, each predicted trajectory can be associated with an end location or area, which can comprise an area in which the entity is predicted to be located at the future time. When evaluating a motion prediction model, this predicted area can comprise a "hit" area. Thus, if the ground truth future position of the entity ends up within this predicted area, an evaluation model 230 of the computing system 200 will evaluate the prediction as a hit. Any ground truth position of the entity that is external to this predicted area can comprise a miss, or an inaccurate prediction.

In further examples, the lane matching module 220 can match the ground-truth endpoint of each external entity to an underlying lane segment. For example, the lane matching module 220 can determine the ground-truth trajectory of the external entity and the ground-truth endpoint of the external entity at the future time at which the predicted endpoints were made (e.g., five seconds subsequent to the prediction). In various examples, the lane matching module 220 can assign the ground-truth endpoint to the actual lane at which the external entity is located, or can determine an assignment confidence for the ground-truth endpoint in the manners described here.

As described above, previous evaluation methods (e.g., Euclidean-based evaluation methods) typically treat longitudinal errors and lateral errors similarly. In the examples described herein, the lane matching module 220 can assign each predicted trajectory for each detected entity to one or more underlying lanes in order to reduce the lateral error tolerance. It is contemplated that the approaches described herein provide a more realistic measures of risk and/or accuracy in real-world driving environments, since lateral errors may allow for placement of the trajectory endpoints in opposing traffic lanes. In various examples, the lane matching module 220 can perform a comparison of (i) the endpoint of the predicted trajectory and the orientation of the predicted trajectory at the endpoint, to (ii) the centerlines of the surrounding lanes. Based on the distance of the endpoint to each surrounding lane segment and the difference in orientation to the surrounding lane segment, the lane matching module 220 can determine an assignment confidence for each surrounding lane segment. In various examples, the lane segment(s) having a highest determined assignment confidence may be selected as the matched lane segment(s) for the predicted trajectory.

In some aspects, the lane matching module 220 can reference map data to match the trajectory endpoints to the underlying lanes of the road segment. For example, the computing system 200 may include a mapping module 215 that generates, stores, or otherwise retrieves map data comprising the road network on which the vehicles 285 operate. The map data can include details of the lane topology, including lane markings that divide traffic lanes moving in the same direction (e.g., hashed markings), lane markings that indicate turning lanes, and lane markings that differentiate same-directional traffic from oncoming traffic. In some examples, the lane matching module 220 can utilize the map data to match the endpoints of the trajectories to particular lanes having the same direction of travel as the vehicle 285. In variations, the lane matching module 220 does not differentiate between same-directional and oncoming traffic lanes, but rather performs the distance-based and orientation-based assignment confidence calculations agnostic to the directionality of the lanes.

In one example, the lane matching module 220 matches the trajectory endpoint to underlying lanes by comparing the endpoint of the trajectory and the orientation of the trajectory at the endpoint to the centerlines of all surrounding lane segments. Based on the distance to a surrounding lane segment and the difference in orientation to this surrounding lane segment, the lane matching module calculates an assignment confidence. Assuming that d is the shortest distance of the endpoint of the trajectory to the centerline of a surrounding lane segment, and $\alpha$ is the difference in orientation of the endpoint and the surrounding lane segment, the assignment confidence can be calculated as follows:

Distance-based assignment confidence:

$$p_{dist} = \max\left(0, 1 - \left(\frac{d}{d_{normalization}}\right)\right),$$

with $d_{normalization}$ corresponding to a normalization factor of the distance, e.g., 5 Meters.

Orientation-based assignment confidence:

$$p_{orient} = \max\left(0, 1 - \left(\frac{\alpha}{\alpha_{normalization}}\right)\right),$$

with $\alpha_{normalization}$ corresponding to a normalization factor of the angle (e.g., pi). Combined final assignment confidence: $p = w \cdot p_{dist} + (1-w) \, p_{orient}$, with w corresponding to a weighting factor, e.g., 0.5.

In accordance with these calculations, the surrounding lane segment with the highest assignment confidence is then selected by the lane matching module 220 as the matched lane segment. In certain implementations, when the trajectories are matched to underlying lanes, the motion prediction model (MPM) evaluation module 230 can evaluate the accuracy of the motion prediction model. As an example, for each of the matched endpoints of predicted trajectories, the evaluation module 230 can calculate the distance on the lane topology to the matched endpoint of the ground truth trajectory. The evaluation module 230 can further define a threshold for the distance, which can correspond to the miss-rate of the motion prediction model (e.g., any predicted trajectory endpoints outside the threshold can be classified as a miss). In further examples, the threshold can further be comprised as a function of velocity (e.g., thresh=$v_{ground-truth} \cdot const_1 + const_2$; in this case the allowed distance along the lane topology scales linearly with the velocity of the ground-truth trajectory). In an example, the evaluation module 230 can calculate an accuracy metric of the motion prediction model as the ratio of predicted trajectories whose distance is shorter than the threshold. As such, accuracy metric can be interpreted as the miss-rate based on lane topology distance.

According to examples provided herein, the evaluation module 230 can establish a hit area on the lane segment(s) matched to the endpoints of the predicted trajectories and/or the ground-truth endpoint, which have been matched to the underlying lanes of the road segment. The evaluation module 230 may then determine whether the ground truth future position of the external entity (e.g., as recorded by the vehicle 285 at the future time corresponding to the prediction) lands within this established hit area. The evaluation module 230 can perform this dynamic evaluation method for each predicted trajectory of each detected entity external to the vehicle 285 over the course of the vehicle's travel path through the road network. In certain implementations, the vehicle 285 performs motion predictions for each detected vehicle and/or VRU within a certain proximity of the vehicle 285 (e.g., within fifty meters) regardless of the direction of travel of the external entities.

In one or more embodiments, the evaluation module 230 can output a set of accuracy scores indicating the miss-rate of the motion prediction model. In some examples, the set of accuracy scores can differentiate between the type of external entities and/or their respective trajectories, which can be classified in any manner. For example, the evaluation module 230 can output individual accuracy scores for same-directional vehicles, opposing traffic vehicles, same or opposing directional VRUs, VRUs in general, individual classifications for bicyclists and/or pedestrians, and individual classifications for large trucks, regular trucks, vans, cars, etc. As such, using the lane-based evaluation techniques described herein, the evaluation module 230 can provide a more accurate or valuable miss-rate for motion prediction models concerning each of these classifications.

In certain examples, the evaluation module 230 can determine granular levels of accuracy of a particular motion prediction model. For example, the evaluation module 230 can determine that a motion prediction model is particularly highly accurate in predicting trajectories of other vehicles, or that another motion prediction model is highly accurate predicting trajectories of turning vehicles, oncoming vehicles, VRUs, etc. Accordingly, in performing the accuracy evaluation techniques described herein, the evaluation module 230 can determine an "optimal" motion prediction model for a given fleet of vehicles serving one or more purposes. As provided herein, the "optimal" motion prediction model can correspond to the autonomous or semi-autonomous driving tasks required of the vehicles in the fleet.

As an example, the evaluation module 230 can evaluate the accuracy of several motion prediction models to determine an optimal model for use with an advance driver assistance system (ADAS) of a vehicle (e.g., for performing emergency maneuvers or emergency braking actions). As a further example, the evaluation module 230 can identify a motion prediction model that is most optimal for pedestrian and bicyclist trajectory prediction (e.g., for crowded urban roads). As a further example, the evaluation module 230 can identify a most accurate motion prediction model for general autonomous driving operations through typical road traffic consisting of other vehicles (e.g., a motion prediction model that is highly accurate in predicting trajectories of other vehicles generally operating along the same direction as the vehicle 285).

As such, given the fleet of vehicles and their respective purpose(s), the evaluation module 230 can provide a most optimal motion prediction model to a MPM distribution module 235, which can distribute the optimal motion prediction model to the fleet of the vehicles accordingly. In some examples, the evaluation module 230 can further factor in computational constraints for a given fleet of vehicles. For example, the fleet of vehicles may have computer hardware constraints, spatial constraints for the computer hardware, or even cost constraints for the inclusion of sensors or additional computer hardware on each vehicle. In such scenarios, given the constraints of the fleet of vehicles, the evaluation module 230 can identify a most optimal motion prediction model for those vehicles.

As one example, a fleet of trucks may require a motion prediction model having relatively lower computational requirements for general freeway travel with stops limited to near-freeway locations (e.g., distribution centers). The evaluation module 230 can identify a most optimal motion prediction model for these specific purposes and constraints. As another example, a fleet of vehicles may have sufficient computer hardware for executing any motion prediction model, and may require a motion prediction model that is near-perfect in urban settings where dense VRU traffic is prevalent. The evaluation module 230 can provide the most optimal motion prediction model for these constraints and purposes accordingly.

It is contemplated that the inclusion of lane-matching for motion prediction model evaluation can yield more valuable accuracy determinations than evaluations based solely on, for example, Euclidean space. Further illustration of the advantages of lane-based evaluation techniques is provided below with respect to FIGS. 3A and 3B.

Euclidean-Based Evaluation

Figure 3A:
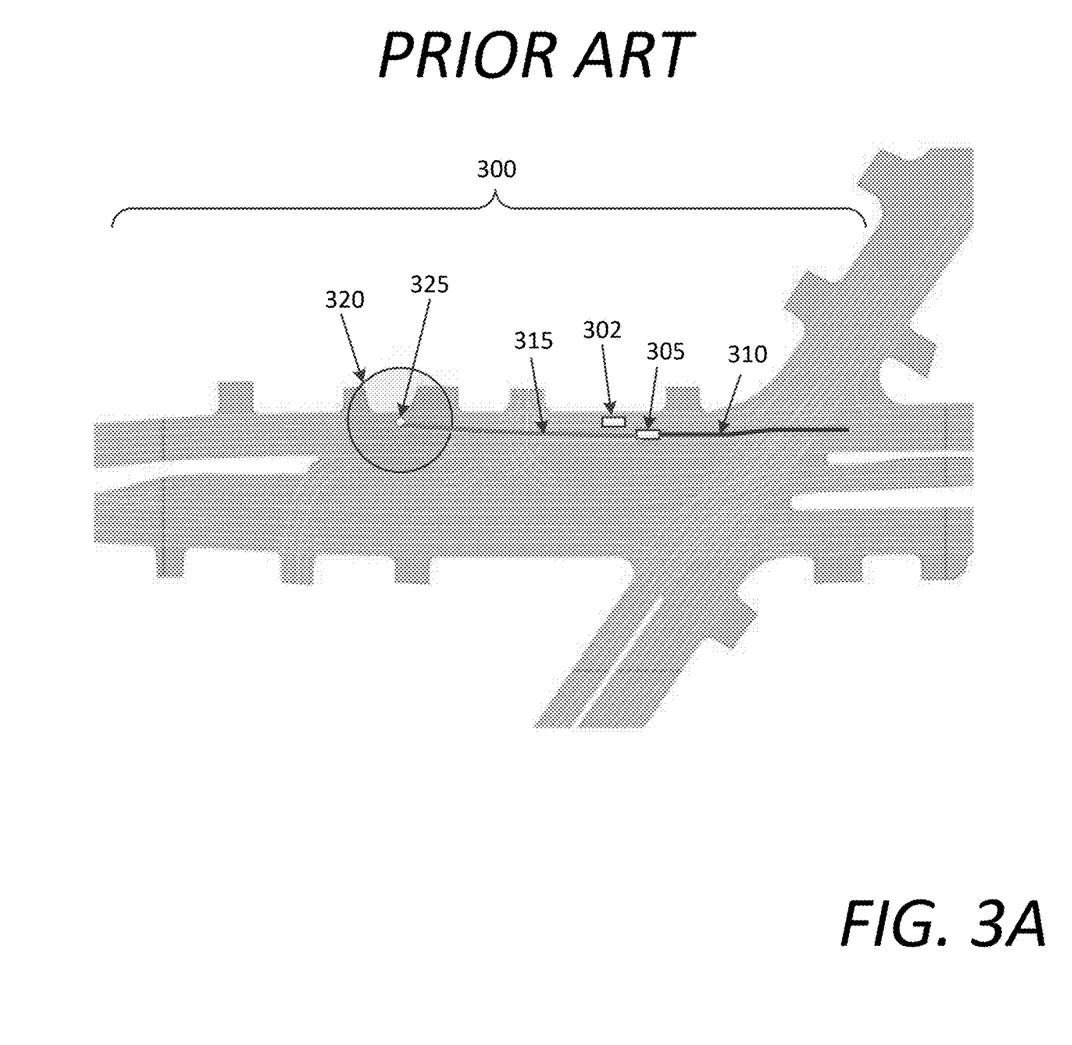
FIG. 3A is a diagram illustrating the use of Euclidean-based distance metrics in evaluating motion prediction models, according to examples described herein.

FIG. 3A is a diagram illustrating the use of Euclidean-based distance metrics in evaluating motion prediction models, according to examples described herein. In the prior art example shown in FIG. 3A, a vehicle 302 executing a motion prediction model detects a proximate entity 305 (e.g., another vehicle) traveling along a road segment 300 on which the vehicle 302 travels. The detected entity 305 has a current ground truth trajectory 310 that comprises a travel path along the road segment 300 that the entity 305 has already traversed. Through execution of the motion prediction model, the vehicle 302 can dynamically determine a predicted trajectory 315 of the entity 305. As such, at any given time, the vehicle 302 can predict the future trajectory of the entity 305 as well as a predicted endpoint 325 of the entity 305 at a future time (e.g., five seconds in the future).

In accordance with Euclidean-based evaluation techniques, the evaluation method forms a geometric threshold encompassing an error tolerance area 320 (e.g., a circle as shown in FIG. 3A). As the vehicle 302 and the entity 305 continue traveling along their respective paths, if the ground truth future position (e.g., the actual position of the entity 305 five seconds into the future from the time of prediction) of the entity 305 is located within the error tolerance area 320, then the trajectory prediction is counted as an accuracy hit. If the ground truth future position of the entity 305 is outside the tolerance area 320, the prediction is treated as an accuracy miss. As such, the evaluation of the motion prediction model occurs for all detected entities in which trajectory predictions are made by the vehicle 302 over the course of a travel route. It is contemplated herein that the lateral error tolerance of the error tolerance area 320 may be unacceptably large, providing accuracy hits for trajectories that may end up in opposing lanes of traffic. In such examples, a motion prediction model having unacceptably large lateral error predictions may be evaluated as highly accurate using Euclidean-based techniques, which may result in the certification of sub-optimal motion prediction models for use on a road network.

Lane-Based Evaluation

Figure 3B:
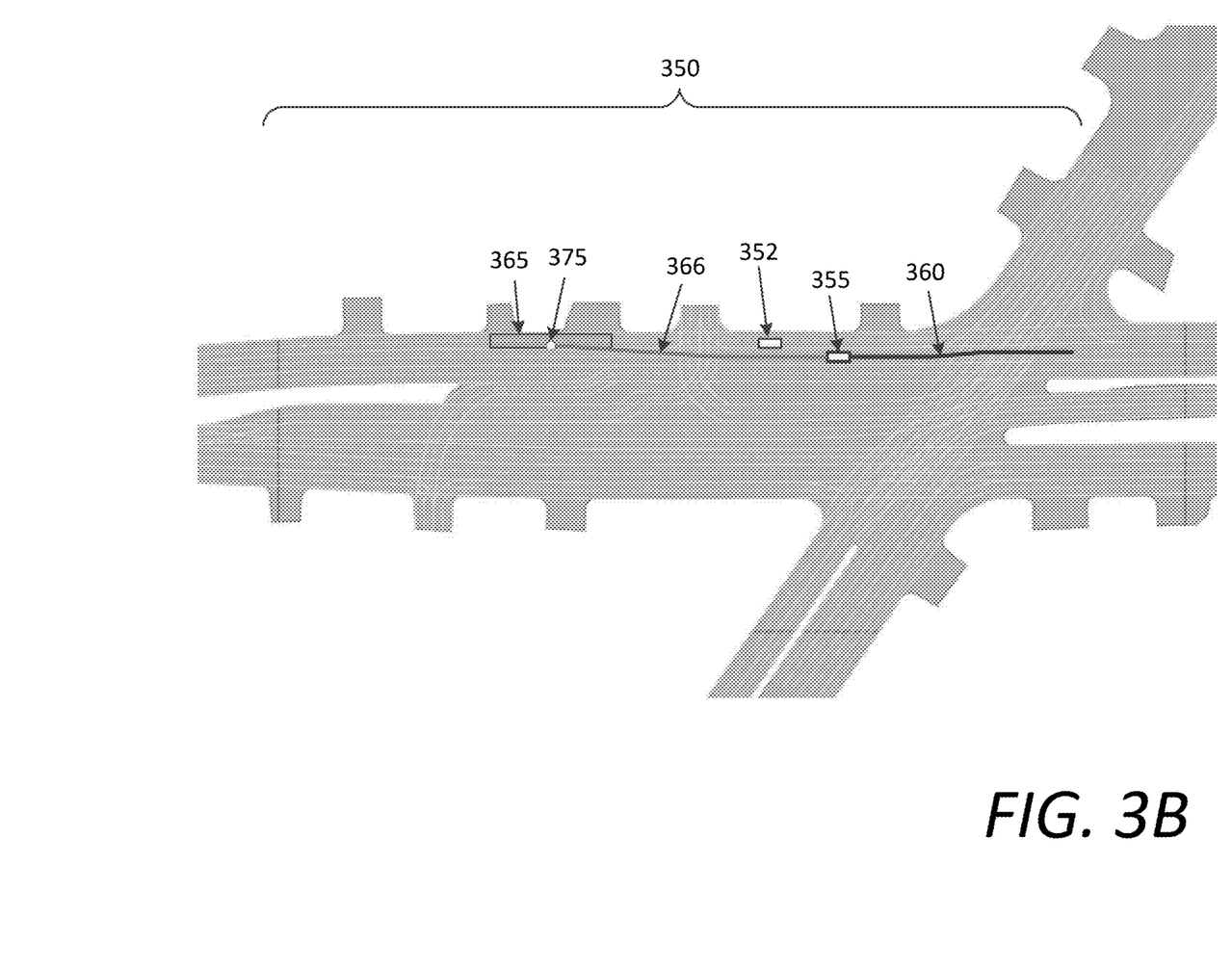
FIG. 3B is a diagram illustrating the use of lane-based distance metrics for evaluating motion prediction models, according to examples described herein.

FIG. 3B is a diagram illustrating the use of lane-based distance metrics for evaluating motion prediction models, according to examples described herein. As shown in the diagram of FIG. 3B, the longitudinal error tolerance in the error tolerance area 365 is substantially preserved, whereas the lateral error tolerance is significantly reduced. Referring to FIG. 3B, a vehicle 352 travels along a road segment 350 and detects an external entity 355 that has currently traveled a ground truth path 360. In the example shown in FIG. 3B, the entity 355 can comprise another vehicle traveling along the same road segment. In further examples, the vehicle 352 can detect any number of external entities at any given time (e.g., other vehicles and/or VRUs), and can perform motion prediction on each detected entity. The vehicle 352 can execute a motion prediction model to predict a trajectory 366 of the entity 355, and an endpoint 375 of the predicted trajectory 366 at a designated future time (e.g., five seconds in the future).

In accordance with examples described herein, lane matching module 220 of the computing system 200, described with respect to FIG. 2, can perform the assignment confidence calculations and match the predicted trajectory and the ground truth trajectory to one or more underlying lanes. The evaluation module 230 of the computing system 200 can utilize the matched lane segment(s) for the predicted trajectory or end point(s) and the ground-truth trajectory or endpoint to generate an error tolerance area 365 based on the underlying lane topology. Thus, if the ground truth future position of the entity 355 lands within the error tolerance area 365, the evaluation module 230 will count the prediction as a hit. Accordingly, if the ground truth future position of the entity 355 lands outside the error tolerance area 365, the evaluation module 230 will record the trajectory prediction as a miss.

It is contemplated that all of the trajectory predictions by the motion prediction model can be evaluated in the manner described herein, and an overall set of accuracy scores can be determined for the motion prediction model. As shown in FIG. 3B, by matching the predicted trajectory to the underlying lanes for evaluation purposes, lateral error tolerance is significantly reduced while the longitudinal tolerance is substantially maintained (e.g., due to longitudinal accuracy being less critical for safety). As such, the computing system 200 can output accuracy scores for motion prediction models that are more valuable for road network safety in the field of autonomous vehicle operations.

Methodology

Figure 4:
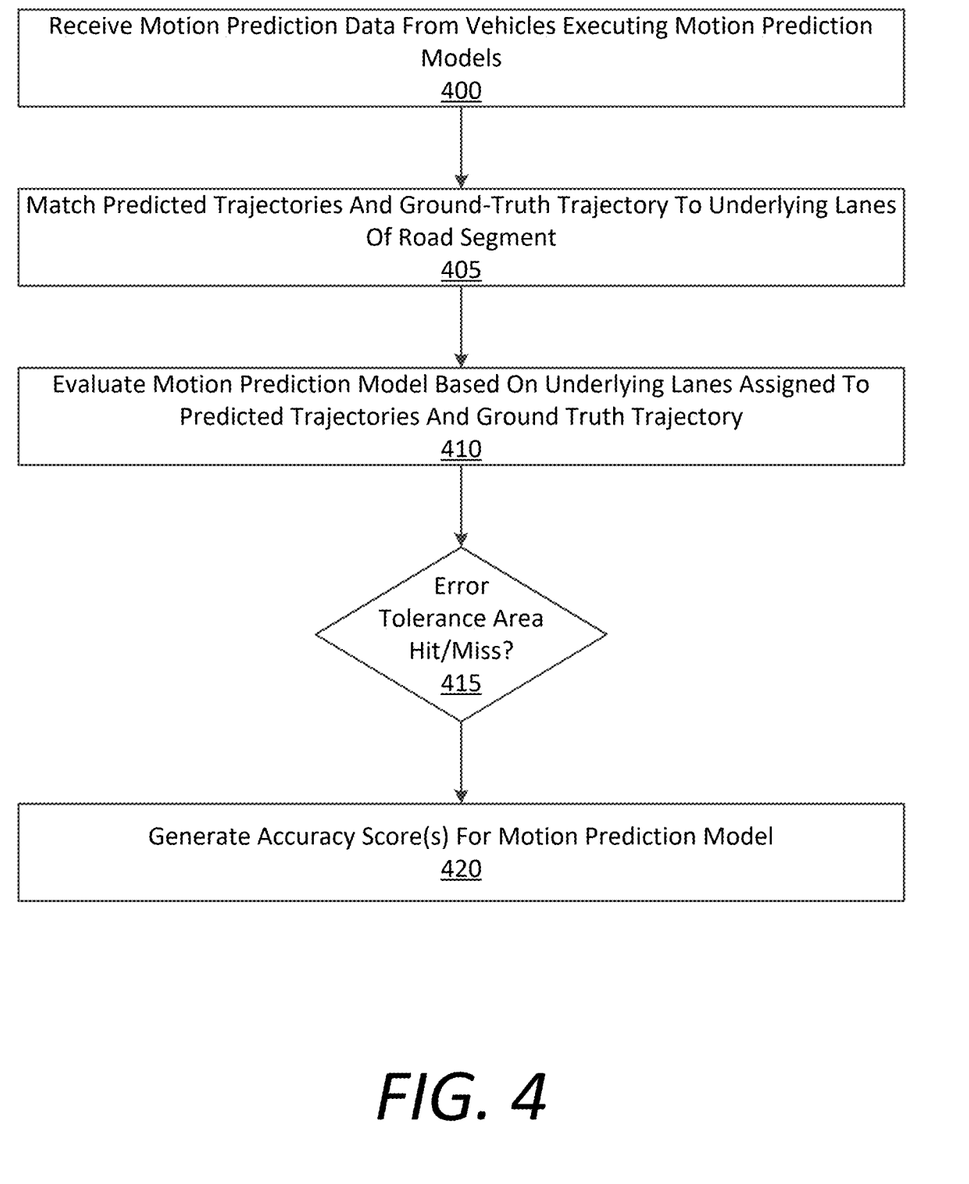
FIGS. 4 and 5 are flow charts describing example methods of evaluating motion prediction models in accordance with the various examples described herein.
Figure 5:
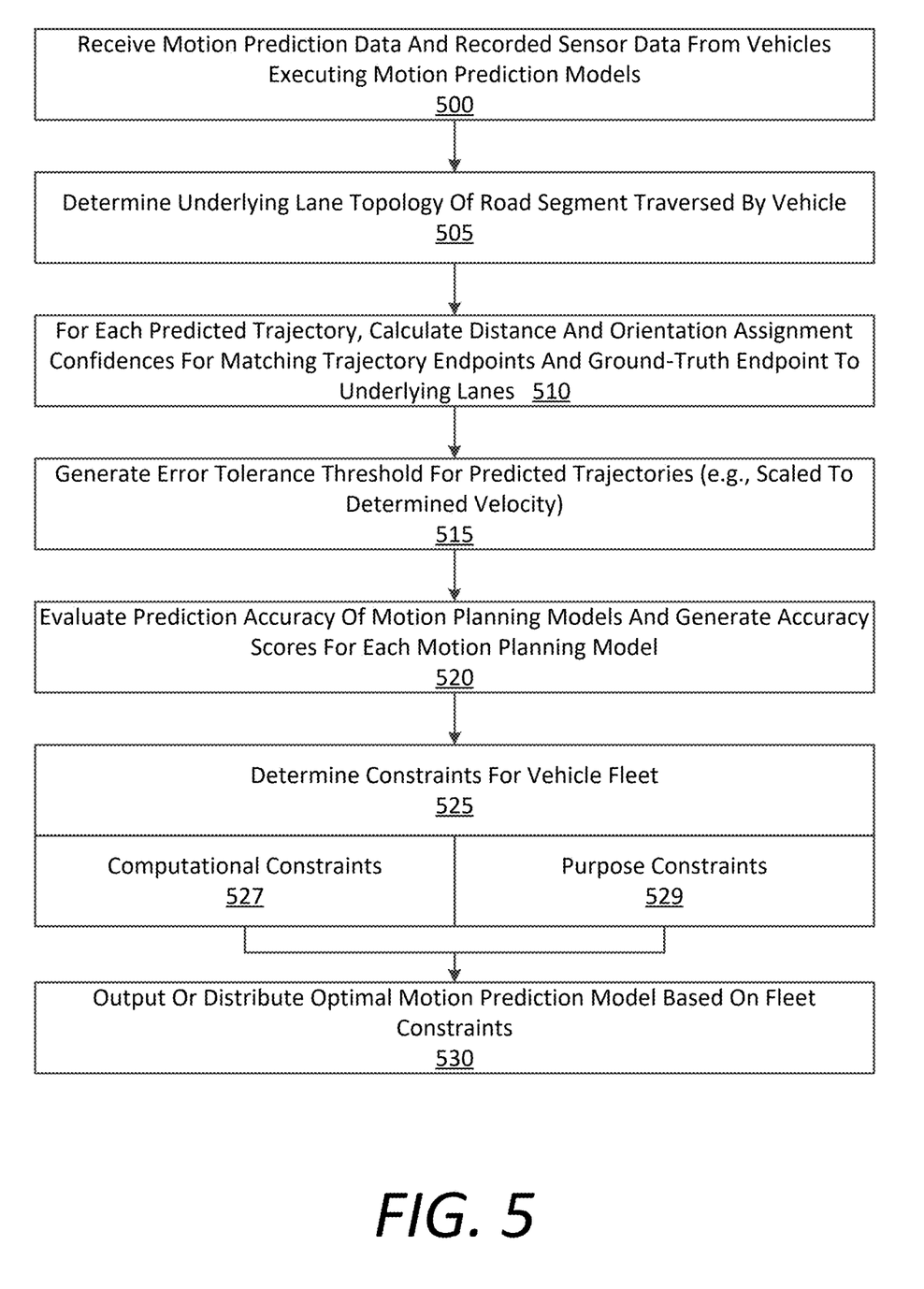

FIGS. 4 and 5 are flow charts describing example methods of evaluating motion prediction models in accordance with the various examples described herein. In the below descriptions of FIGS. 4 and 5, reference may be made to reference characters representing various features as shown and described with respect to FIGS. 1 and 2. Furthermore, the processes described in connection with FIGS. 4 and 5 may be performed by an example computing system 200 as described with respect to FIG. 2. Further still, certain steps described with respect to the flow charts of FIGS. 4 and 5 may be performed prior to, in conjunction with, or subsequent to any other step, and need not be performed in the respective sequences shown.

Referring to FIG. 4, at block 400, the computing system 200 can receive motion prediction data from vehicles 285 executing motion prediction models (e.g., for autonomous driving purposes). As described herein, the motion prediction data can indicate trajectory and/or endpoint predictions of entities external to the vehicle 285. These entities can comprise other vehicles, VRUs, and other moving objects. As an example, the motion prediction model executing on-board the vehicle 285 can detect external entities, determine their current headings and velocities, and predict each of their trajectories and a location at which the entity will be located at a future point in time (e.g., five seconds in the future). At block 405, the computing system 200 can match the predicted trajectories of the external entities and the ground-truth trajectory of the external entities to underlying lanes of the road segment on which the vehicles traverse. In particular, the endpoint(s) of the predicted trajectory and ground-truth trajectory can be assigned to one or more underlying lanes, which can defined an error tolerance area for the motion prediction model.

At block 410, the computing system 200 can evaluate the motion prediction model based on the underlying lanes assigned to the predicted trajectories and ground-truth trajectory. In doing so, the computing system 200 can determine whether the ground truth future position of the entity is located within the error tolerance area (hit) or outside the error tolerance area (miss). At decision block 415, based on the evaluation of the motion prediction model—for predicted trajectories of any number of external entities detected by the vehicle 285—the computing system 200 can generate a set of accuracy scores for the motion prediction model, at block 420. As described throughout the present disclosure, the evaluation methods described herein substantially preserve longitudinal error tolerance in the direction of travel (e.g., the direction of the underlying lanes) while reducing lateral error tolerance.

FIG. 5 is another flow chart describing a method of evaluating motion prediction models, in accordance with examples described herein. Referring to FIG. 5, at block 500, the computing system 200 can receive motion prediction data and recorded sensor data from vehicles 285 executing motion prediction models to navigate and/or autonomously operate throughout a road network. As provided herein, the sensor data can comprise any combination of image data from one or more on-board cameras, LIDAR data, radar data, ultrasonic sensor data, and the like. At block 505, the computing system 200 can determine the underlying lane topology of the road segment being traversed by the vehicle 285. At block 510, for each predicted trajectory of each entity and the ground truth trajectory of each entity, the computing system 200 can calculate distance and orientation assignment confidences for matching the endpoint(s) of the trajectories to one or more underlaying lanes.

At block 515, in various examples, the computing system 200 can generate error tolerance thresholds based on the assigned lane(s) for each of the predicted trajectories. As described herein, these thresholds may be scaled based on the determined velocities of the external entities. For example, longitudinal error tolerance may be increased for faster moving vehicles. At block 520, the computing system 200 can evaluate the prediction accuracy of each of the motion prediction models based on the lane matching techniques described herein, and generate a set of accuracy scores for each motion prediction model to determine the prediction performance of the motion prediction model. As described above, the accuracy scores can be based on the hit-rates of predicted endpoints within the error tolerance areas coupled to each predicted trajectory.

In certain implementations, at block 525, the computing system 200 can determine a set of constraints for a vehicle fleet requiring a motion prediction model for autonomous or semi-autonomous driving. At block 527, the set of constraints can correspond to computational constraints based on the computer hardware provided with each vehicle of the fleet (e.g., computing power limitations). At block 529, the set of constraints can correspond to purpose constraints for the vehicle fleet. For example, the fleet may be utilized primarily for urban driving, freeway driving, rural driving, deliveries, human transport, and the like. In certain examples, at block 530, the computing system 200 can utilize the accuracy scores of the motion prediction models to determine an optimal motion prediction model for the vehicle fleet based on the set of constraints, and output or otherwise facilitate distribution of the optimal motion prediction model to the vehicle fleet.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A computing system comprising:
   one or more processors;
   a memory storing instructions that, when executed by the one or more processors, cause the computing system to:
   receive motion prediction data from a vehicle, the motion prediction data being generated by a motion prediction model executing on the vehicle as the vehicle operates on a road network;
   based on the motion prediction data, determine a set of predicted trajectories for each of a plurality of entities in a surrounding environment of the vehicle;
   determine an underlying lane topology of a road segment on which the vehicle operates;
   evaluate a prediction performance of the motion prediction model by
   (i) matching, for each respective entity of the plurality of entities, a predicted endpoint of each predicted trajectory of the set of predicted trajectories to one or more underlying lanes of the underlying lane topology of the road segment, (ii) matching a ground truth future position of the respective entity to one or more underlying lanes of the underlying lane topology, and (iii) determining a distance along one or more lane segments between the one or more underlying lanes matched to the predicted endpoint and the one or more underlying lanes matched to the ground truth future position;
   wherein the executed instructions cause the computing system to match the predicted endpoint of the set of predicted trajectories to the one or more underlying lanes by calculating an assignment confidence for each of the one or more underlying lanes based on the set of predicted trajectories by dynamically calculating (i) a distance-based assignment confidence, and (ii) an orientation-based assignment confidence for each surrounding lane segment of the predicted endpoint;
   wherein the one or more underlying lanes correspond to highest assignment confidences based on dynamically calculating the distance-based assignment confidence and the orientation-based assignment confidence;
   wherein execution of the motion prediction model causes the vehicle to dynamically generate a motion plan based, at least in part, on the set of predicted trajectories for each of the plurality of entities in the surrounding environment of the vehicle; and
   autonomously operate a set of control mechanisms of the vehicle to execute the motion plan.

2. The computing system of claim 1, wherein the executed instructions further cause the computing system to:
   receive recorded sensor data from the vehicle, the recorded sensor data indicating a ground truth trajectory for each of the plurality of entities; and
   based on the ground truth trajectory for each of the plurality of entities, determine the ground truth future position of each of the plurality of entities.

3. The computing system of claim 1, wherein the set of control mechanisms comprises a plurality of the following: a braking system of the vehicle, a steering system of the vehicle, an acceleration system of the vehicle, or a signaling system of the vehicle.

4. The computing system of claim 1, wherein the executed instructions cause the computing system to evaluate the prediction performance of each of a plurality of motion prediction models to determine a most accurate motion prediction model for execution on autonomous vehicles.

5. The computing system of claim 1, wherein the plurality of entities comprise other vehicles operating along the road segment.

6. A non-transitory computer readable medium storing instructions that, when executed by one or more processors of a computing system, cause the computing system to:
   receive motion prediction data from a vehicle, the motion prediction data being generated by a motion prediction model executing on the vehicle as the vehicle operates on a road network;
   based on the motion prediction data, determine a set of predicted trajectories for each of a plurality of entities in a surrounding environment of the vehicle;
   determine an underlying lane topology of a road segment on which the vehicle operates;
   evaluate a prediction performance of the motion prediction model by (i) matching, for each respective entity of the plurality of entities, a predicted endpoint of each predicted trajectory of the set of predicted trajectories to one or more underlying lanes of the underlying lane topology of the road segment, (ii) matching a ground truth future position of the respective entity to one or more underlying lanes of the underlying lane topology, and (iii) determining a distance along one or more lane segments between the one or more underlying lanes matched to the predicted endpoint and the one or more underlying lanes matched to the ground truth future position;
   wherein the executed instructions cause the computing system to match the predicted endpoint of the set of predicted trajectories to the one or more underlying lanes by calculating an assignment confidence for each of the one or more underlying lanes based on the set of predicted trajectories by dynamically calculating (i) a distance-based assignment confidence, and (ii) an orientation-based assignment confidence for each surrounding lane segment of the predicted endpoint;
   wherein the one or more underlying lanes correspond to highest assignment confidences based on dynamically calculating the distance-based assignment confidence and the orientation-based assignment confidence;
   wherein execution of the motion prediction model causes the vehicle to dynamically generate a motion plan based, at least in part, on the set of predicted trajectories for each of the plurality of entities in the surrounding environment of the vehicle; and
   autonomously operate a set of control mechanisms of the vehicle to execute the motion plan.

7. The non-transitory computer readable medium of claim 6, wherein the executed instructions further cause the computing system to:
   receive recorded sensor data from the vehicle, the recorded sensor data indicating a ground truth trajectory for each of the plurality of entities; and
   based on the ground truth trajectory for each of the plurality of entities, determine the ground truth future position of each of the plurality of entities.

8. The non-transitory computer readable medium of claim 6, wherein the set of control mechanisms comprises a plurality of the following: a braking system of the vehicle, a steering system of the vehicle, an acceleration system of the vehicle, or a signaling system of the vehicle.

9. The non-transitory computer readable medium of claim 6, wherein the executed instructions cause the computing system to evaluate the prediction performance of each of a plurality of motion prediction models to determine a most accurate motion prediction model for execution on autonomous vehicles.

10. The non-transitory computer readable medium of claim 6, wherein the plurality of entities comprise other vehicles operating along the road segment.

11. A computer-implemented method, comprising:
receiving motion prediction data from a vehicle, the motion prediction data being generated by a motion prediction model executing on the vehicle as the vehicle operates on a road network;
based on the motion prediction data, determining a set of predicted trajectories for each of a plurality of entities in a surrounding environment of the vehicle;
determining an underlying lane topology of a road segment on which the vehicle operates;
evaluating a prediction performance of the motion prediction model by (i) matching, for each respective entity of the plurality of entities, a predicted endpoint of each predicted trajectory of the set of predicted trajectories to one or more underlying lanes of the underlying lane topology of the road segment, (ii) matching a ground truth future position of the respective entity to one or more underlying lanes of the underlying lane topology, and (iii) determining a distance along one or more lane segments between the one or more underlying lanes matched to the predicted endpoint and the one or more underlying lanes matched to the ground truth future position;
wherein the executed instructions cause the computing system to match the predicted endpoint of the set of predicted trajectories to the one or more underlying lanes by calculating an assignment confidence for each of the one or more underlying lanes based on the set of predicted trajectories by dynamically calculating (i) a distance-based assignment confidence, and (ii) an orientation-based assignment confidence for each surrounding lane segment of the predicted endpoint;
wherein the one or more underlying lanes correspond to highest assignment confidences based on dynamically calculating the distance-based assignment confidence and the orientation-based assignment confidence;
wherein execution of the motion prediction model causes the vehicle to dynamically generate a motion plan based, at least in part, on the set of predicted trajectories for each of the plurality of entities in the surrounding environment of the vehicle; and
autonomously operate a set of control mechanisms of the vehicle to execute the motion plan.

12. The method of claim 11, further comprising:
receiving recorded sensor data from the vehicle, the recorded sensor data indicating a ground truth trajectory for each of the plurality of entities; and
based on the ground truth trajectory for each of the plurality of entities, determining the ground truth future position of each of the plurality of entities.

* * * * *